(12) United States Patent
Foor et al.

(10) Patent No.: US 8,394,331 B2
(45) Date of Patent: Mar. 12, 2013

(54) NEXT GENERATION COMBINED HYDROCARBON/OZONE CONVERTER

(75) Inventors: Belinda Sue Foor, Chicago, IL (US); Mariola Jolanta Proszowski, Des Plaines, IL (US); Peter Michalakos, Arlington Heights, IL (US)

(73) Assignee: Honeywell International Inc., Morristown, NJ (US)

( * ) Notice: Subject to any disclaimer, the term of this patent is extended or adjusted under 35 U.S.C. 154(b) by 32 days.

(21) Appl. No.: 13/189,261

(22) Filed: Jul. 22, 2011

(65) Prior Publication Data

US 2013/0022523 A1 Jan. 24, 2013

(51) Int. Cl.
*A61L 9/00* (2006.01)
*A62B 11/00* (2006.01)

(52) U.S. Cl. .................................. 422/120; 422/122

(58) Field of Classification Search .................. 422/120, 422/122
See application file for complete search history.

(56) References Cited

U.S. PATENT DOCUMENTS

| | | |
|---|---|---|
| 4,206,083 A | 6/1980 | Chang |
| 4,343,776 A | 8/1982 | Carr et al. |
| 4,348,360 A | 9/1982 | Chang et al. |
| 4,976,929 A | 12/1990 | Cornelison et al. |
| 5,422,331 A | 6/1995 | Galligan et al. |
| 5,653,949 A | 8/1997 | Chen et al. |
| 6,203,771 B1 | 3/2001 | Lester et al. |
| 6,576,199 B1 | 6/2003 | Liu et al. |
| 6,689,327 B1 | 2/2004 | Reck et al. |
| 7,037,878 B2 | 5/2006 | Liu et al. |
| 7,604,779 B2 | 10/2009 | Liu et al. |
| 7,629,290 B2 | 12/2009 | Michalakos et al. |
| 2001/0006934 A1 | 7/2001 | Kachi et al. |
| 2006/0084571 A1 | 4/2006 | Michalakos et al. |
| 2010/0152032 A1 | 6/2010 | Galligan |
| 2012/0114540 A1* | 5/2012 | Chin et al. ................. 423/245.1 |

FOREIGN PATENT DOCUMENTS

EP 0367574 A2 5/1990

OTHER PUBLICATIONS

S.A. Solov'ev and S.N. Orlik, Structural and Functional Design of Catalytic Converters for Emissions from Internal Combustion Engines, ISSN 0023-1584, Kinetics and Catalysis, 2009, vol. 50, No. 5, pp. 705-714, Pleiades Publishing, Ltd. Original Russian Text published in Kinetika I Kataliz, 2009, vol. 50, No. 5, pp. 734-744.

* cited by examiner

*Primary Examiner* — Timothy Vanoy
(74) *Attorney, Agent, or Firm* — Shimokaji & Assoc., PC

(57) ABSTRACT

A combined hydrocarbon/ozone converter includes a substrate, a metal oxide washcoat and a hydrocarbon converting catalyst, such as platinum. The metal oxide washcoat comprises an ozone reacting component, such as cobalt oxide, and a non-catalytic component, such as aluminum oxide. The weight ratio of the hydrocarbon converting catalyst to the ozone reacting component may be between about 1:5 and about 1:100.

20 Claims, 6 Drawing Sheets

| | SAMPLE # | DESCRIPTION | CO-ICP WT% | PT-ICP WT% |
|---|---|---|---|---|
| BASELINE CHOC | 40067-148-2 | 2X 1.5% PT ON CO WASHCOAT | 11.1 | 2.51 |
| CHOC-AL | 40073-106-1 | 2X 1.5% PT ON COA WASHCOAT | 6.23 | 1.96 |

NEXT GENERATION COMBINED HYDROCARBON/OZONE CONVERTER

CROSS-REFERENCE TO RELATED APPLICATIONS

The present application is related to issued U.S. Pat. Nos. 6,576,199, 7,037,878, 7,604,779, and 7,629,290, all of which are incorporated herein by reference.

BACKGROUND OF THE INVENTION

The present invention relates to catalytic converters and, more particularly, to combined hydrocarbon and ozone converters (CHOC).

Environmental control systems (ECS) may receive compressed air, such as bleed air from a compressor stage of an aircraft. The ECS may cool and condition the bleed air for use in the aircraft cabin and cockpit.

Toxic ozone in the bleed air may become an issue when the aircraft is cruising at altitudes that exceed 20,000 feet. Ozone ($O_3$) is an allotropic form of oxygen and is much more active chemically than ordinary oxygen ($O_2$). It is formed photochemically from oxygen in the Earth's atmosphere and is normally present at high altitudes. To reduce the ozone to a level within satisfactory limits, such as below FAA limits, the ECS may include an ozone-destroying catalytic converter.

Hydrocarbons in the bleed air also may become an issue as they may be odorous and unpleasant for passengers and crew. Odors in aircraft cabins frequently result from ground operations. While an airplane is in the taxi line, exhaust from other airplanes may be ingested into the bleed air system. Hydrocarbons present in bleed air also may include aviation lubricant fumes, hydraulic fluid, and engine exhaust. Hydrocarbons from refueling operations, de-icing operations and ground vehicle exhaust also may be ingested into the bleed air system. To reduce odors, the ECS may include a catalytic converter that converts the hydrocarbons into carbon dioxide and water.

Aircraft have used CHOC to convert ozone to oxygen and to convert hydrocarbons into carbon dioxide and water. The combined converters may perform both functions while also reducing weight and pressure drop when compared to separate ozone and hydrocarbon converters. Although the combined converters may reduce the odor to a significant extent, further odor reduction is desired. Increasing the amount of hydrocarbon catalyst may further reduce odor; however, the expense of the catalyst, which may comprise a precious metal, may be prohibitive.

As can be seen, there is a need for improved combined hydrocarbon and ozone converters. There is a need for an improved catalytic converter that does not increase manufacturing costs. A CHOC is needed wherein hydrocarbon conversion is increased without increasing the amount of hydrocarbon catalyst.

SUMMARY OF THE INVENTION

In one aspect of the present invention, an apparatus comprises a substrate; a washcoat in contact with the substrate, the washcoat including an ozone reacting component and a non-catalytic component; and a hydrocarbon converting catalyst incorporated into the washcoat wherein a weight ratio of the hydrocarbon converting catalyst to the ozone reacting component is between about 1:5 and about 1:100.

In another aspect of the present invention, an apparatus comprises a substrate; a metal oxide washcoat deposited onto the substrate, the metal oxide washcoat including cobalt oxide and aluminum oxide wherein a weight ratio of the cobalt oxide to the aluminum oxide is between about 1:0.6 and about 1:2; and a precious metal impregnated into the metal oxide washcoat.

In a further aspect of the present invention, a method of providing a conditioned air flow comprises the steps of providing a supply of bleed air that includes a plurality of ozone molecules and a plurality of hydrocarbon molecules; passing the supply of bleed air in contact with a catalytic converter, the catalytic converter including cobalt oxide, aluminum oxide and platinum; destroying at least one of the ozone molecules; and converting at least one of the hydrocarbon molecules to carbon dioxide and water.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide combined hydrocarbon and ozone converters having increased hydrocarbon conversion performance as compared to existing converters. Embodiments of the present invention may find beneficial use in industries such as aerospace. Embodiments of the present invention may be useful in applications including environmental control systems and catalytic converters. Embodiments of the present invention may be useful in any air conditioning application including, but not limited to, environmental control systems for aircraft.

Figure 1:
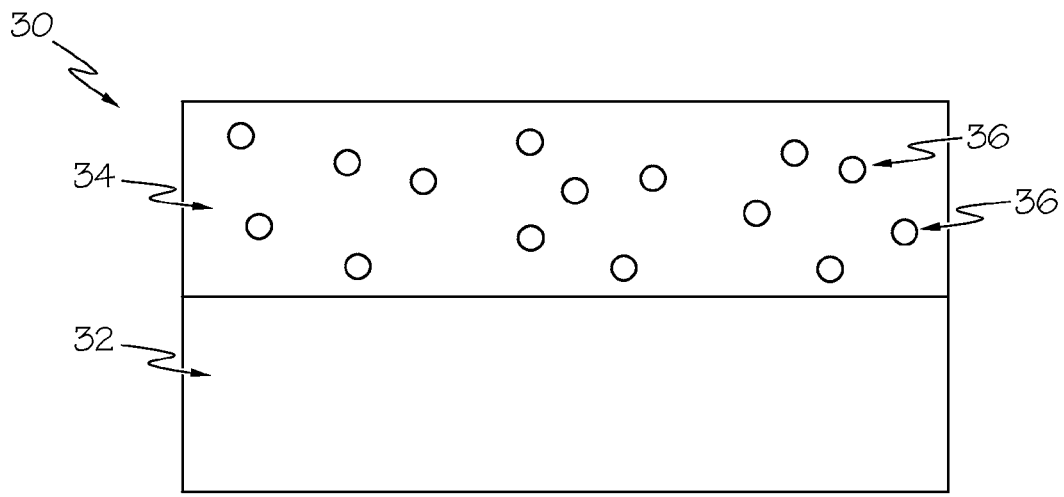
FIG. 1 is a cross sectional view of a portion of a catalytic converter according to one embodiment of the present invention.

A catalytic converter 30, according to an embodiment of the present invention, is shown in FIG. 1. The catalytic converter 30 may include a substrate 32, a washcoat 34 and a hydrocarbon converting catalyst 36.

The substrate 32 may comprise a structure designed to support the washcoat 34. The substrate 32 may be designed to position the washcoat 34 in fluid communication with a supply of bleed air (not shown). For some embodiments, the substrate 32 may comprise a component of an environmental control system (not shown), an auxiliary power unit bleed duct (not shown), or a precooler (not shown). For some embodiments, the substrate 32 may comprise ceramic, aluminum, steel or nickel alloys.

The washcoat 34 may be in contact with the substrate 32. The washcoat 34 may be deposited onto the substrate 32. The washcoat 34 may comprise a metal oxide washcoat. The washcoat 34 may include an ozone reacting component, such as cobalt oxide ($CO_3O_4$), a non-catalytic component, such as aluminum oxide ("alumina", $Al_2O_3$) and a binder, such as a silica binder. The non-catalytic component provides several benefits to the overall performance of the catalyst.

For some embodiments, the weight ratio of the ozone reacting component to the non-catalytic component may be between about 1:0.6 and about 1:2. For some embodiments, the weight of the ozone reacting component may be about equal to the weight of the non-catalytic component. For some embodiments including $Co_3O_4$ and $Al_2O_3$, the weight ratio of $Co_3O_4$ to $Al_2O_3$ may be between about 1:0.6 and about 1:2.

The hydrocarbon converting catalyst 36 may be incorporated into the washcoat 34. The hydrocarbon converting catalyst 36 may comprise a hydrocarbon-destroying metal, such as a precious metal. The hydrocarbon converting catalyst 36 may comprise platinum (Pt) and may be impregnated into the washcoat 34. Hydrocarbon conversion by the catalyst 36 may be enhanced by the ozone reacting component. The cobalt oxide may act as a promoter for the platinum and may increase the catalytic activity of the platinum.

For some embodiments, the weight ratio of the hydrocarbon converting catalyst 36 to the ozone reacting component of the washcoat 32 may be between about 1:5 and about 1:100. For some embodiments, the weight ratio of the hydrocarbon converting catalyst 36 to the ozone reacting component may be between about 1:5 and about 1:11. For some embodiments including Pt and $Co_3O_4$, the weight ratio of Pt to $Co_3O_4$ may be between about 1:5 and about 1:100 (atomic ratio of Pt:Co from 1:4 to 1:80). For some embodiments including Pt and $Co_3O_4$, the weight ratio of Pt to $Co_3O_4$ may be between about 1:5 and about 1:11 (atomic ratio of Pt:Co from 1:4 to 1:9).

The functional result of the cobalt loading may be increased activity for hydrocarbon conversion, as well as increased contamination resistance of the ozone decomposition function. Because of the high cobalt loading, if some of the active sites are blocked by contaminants, such as sulfur or phosphorous, there may be still enough sites remaining to sustain the ozone destruction activity of the catalyst (ozone reacting component), thus producing a longer-lasting converter 30.

Figure 2:
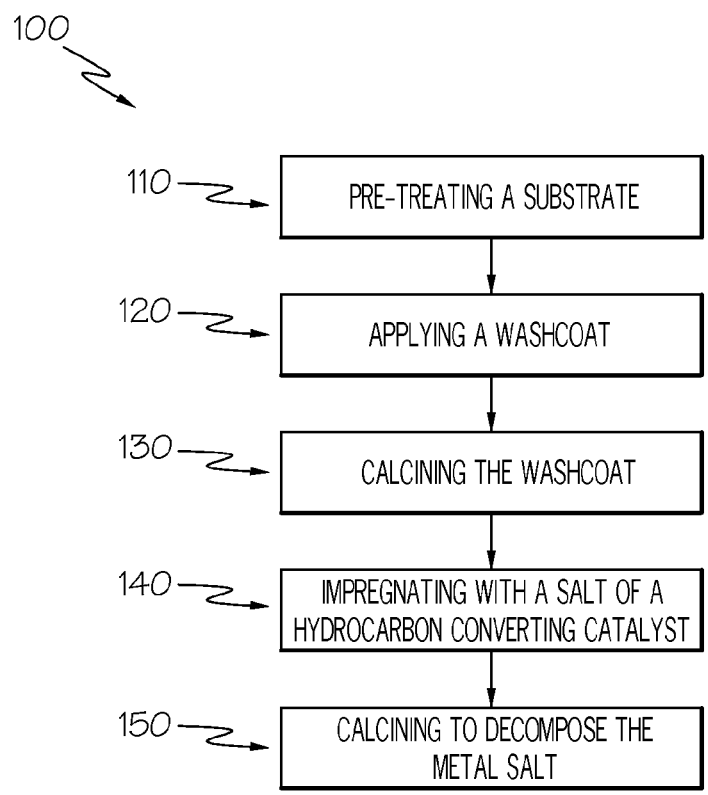
FIG. 2 is a flow chart of a method of preparing a catalytic converter according to one embodiment of the present invention.

A method 100 of preparing the catalytic converter 30 according to one embodiment of the present invention is shown in FIG. 2. The method 100 may include a step 110 of pre-treating a substrate 32, a step 120 of applying a washcoat 34, a step 130 of calcining the washcoat 34, a step 140 of impregnating with a salt of a hydrocarbon converting catalyst 36, and a step 150 of calcining to decompose the metal salt.

The step 110 of pre-treating may include anodizing, etching or baking. The step 120 of applying may include preparing a washcoat slurry by mixing a metal oxide precursor, such as boehmite, with a transition metal compound, such as cobalt carbonate, along with a silicone-containing binder. The slurry may be ball-milled and applied to the substrate 32 under vacuum. The step 130 of calcining may comprise removing the organic portion of the binder, forming a metal oxide from the metal oxide precursor, and forming an ozone-destroying metal oxide from the transition metal compound. The step 120 of applying a washcoat and the step 130 of calcining the washcoat may be repeated until the desired washcoat thickness is obtained. The step 140 of impregnating may include dipping the substrate 32 in a solution of a salt of the metal. The step 150 of calcining may comprise decomposing the metal salt and forming the catalytically active form of the metal.

Figure 3:
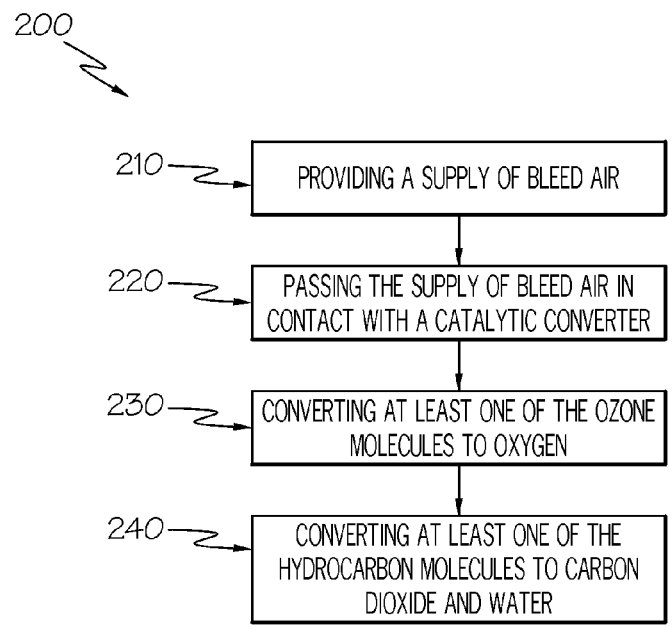
FIG. 3 is a flow chart of a method of providing a conditioned air flow according to an embodiment of the present invention.

A method 200 of providing a conditioned air flow according to one embodiment of the present invention is depicted in FIG. 3. The method 200 may comprise a step 210 of providing a supply of bleed air that includes a plurality of ozone molecules and a plurality of hydrocarbon molecules; a step 220 of passing the supply of bleed air in contact with a catalytic converter 30; a step 230 of converting at least one of the ozone molecules to oxygen; and a step 240 of converting at least one of the hydrocarbon molecules to carbon dioxide and water such that the conditioned air flow is provided.

The step 210 of providing a supply of bleed air can comprise providing a compressed air flow from a main engine of an aircraft. The step 220 of passing the supply of bleed air in contact with a catalytic converter 30 can comprise passing the supply of bleed air through an environmental control system of the aircraft. The step 220 of passing the supply of bleed air in contact with a catalytic converter 30 can comprise passing the supply of bleed air through a precooler of the aircraft. The step 230 of converting at least one of the ozone molecules to oxygen can comprise reacting the ozone molecule with an ozone reacting component of the catalytic converter 30. The step 230 of converting at least one of the ozone molecules to oxygen can comprise reacting the ozone molecule with cobalt oxide of the catalytic converter 30. The step 240 of converting at least one of the hydrocarbon molecules to carbon dioxide and water can comprise reacting the hydrocarbon molecule with a hydrocarbon converting catalyst 36 of the catalytic converter 30. The step 240 of converting at least one of the hydrocarbon molecules to carbon dioxide and water can comprise reacting the hydrocarbon molecule with platinum of the catalytic converter 30.

EXAMPLE 1

Figure 4:
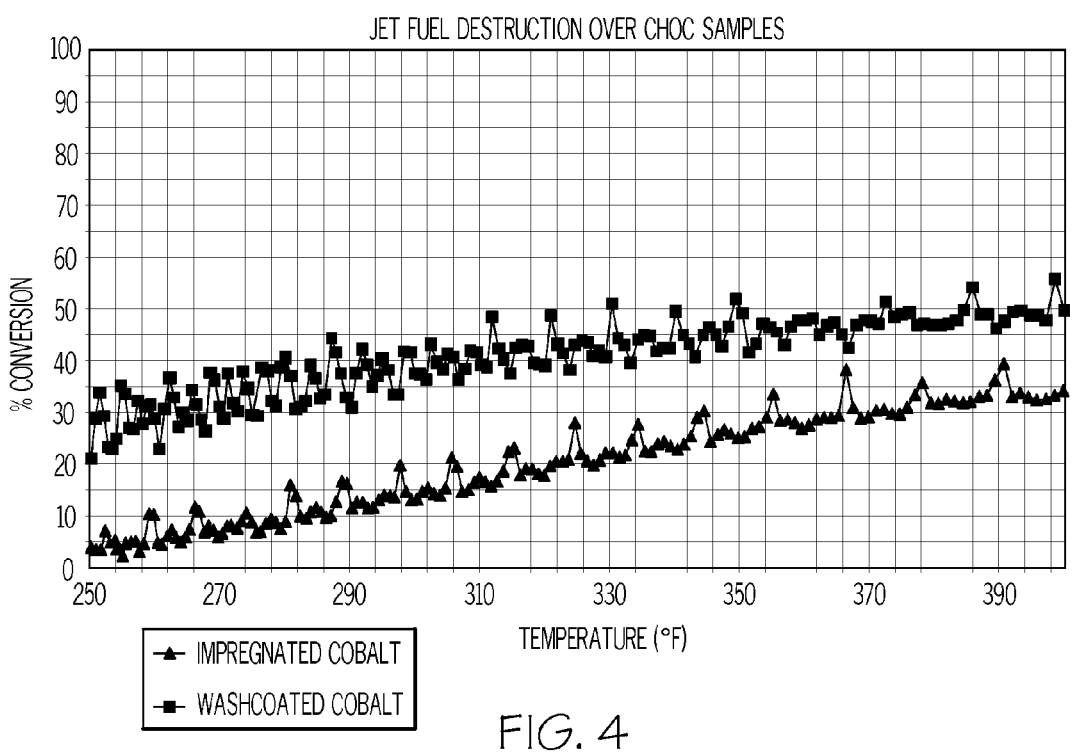
FIG. 4 is a plot of hydrocarbon conversion as a function of temperature according to an embodiment of the present invention.

A plot of hydrocarbon conversion as a function of temperature is shown in FIG. 4. The graph shows jet fuel destruction data for two CHOC samples, one made with cobalt impregnated into an alumina washcoat, and the second made with an embodiment of the present invention: cobalt and alumina washcoated onto the substrate. The sample with the washcoated cobalt has a higher cobalt content than the impregnated cobalt sample, but the platinum loadings are similar (1.00% platinum for the washcoated cobalt catalyst and 1.54% for the impregnated cobalt catalyst). The graph shows an increase in hydrocarbon performance for the higher cobalt loading sample.

EXAMPLE 2

Figures 5, 6:
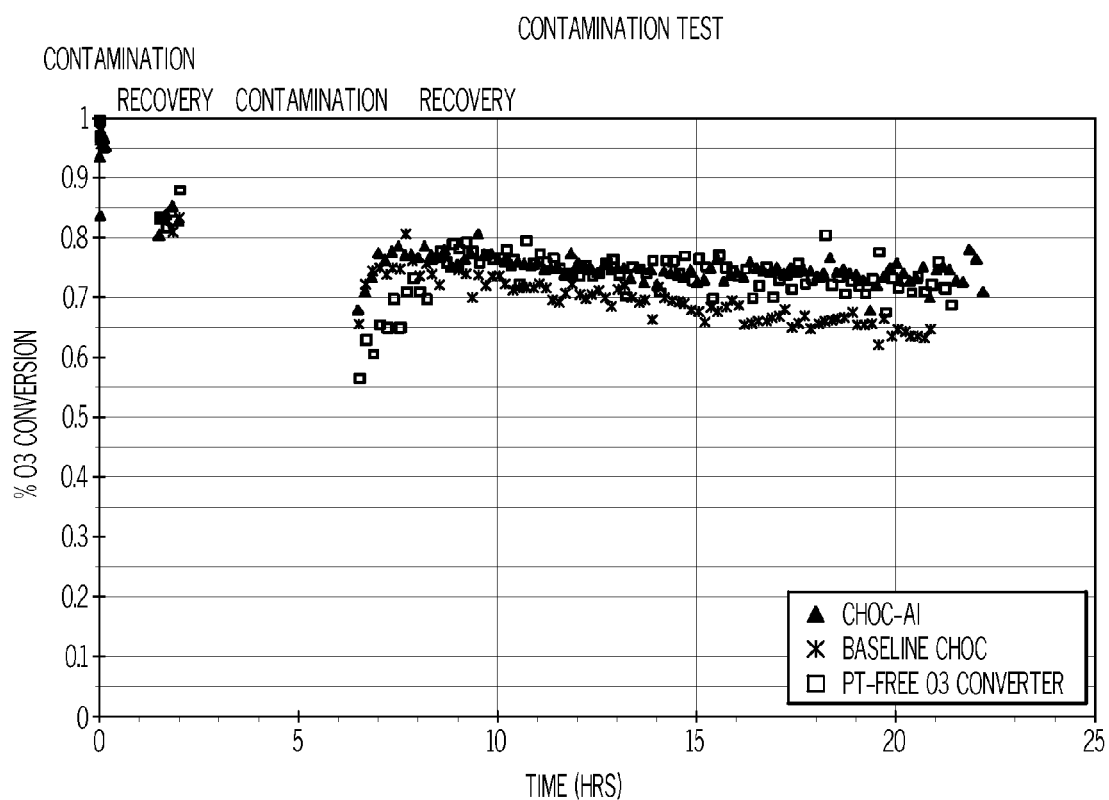
FIG. 5 is a table of design parameters for a catalytic converter according to an embodiment of the present invention.
FIG. 6 is a plot of ozone conversion as a function of time from contamination according to an embodiment of the present invention.
Figure 7:
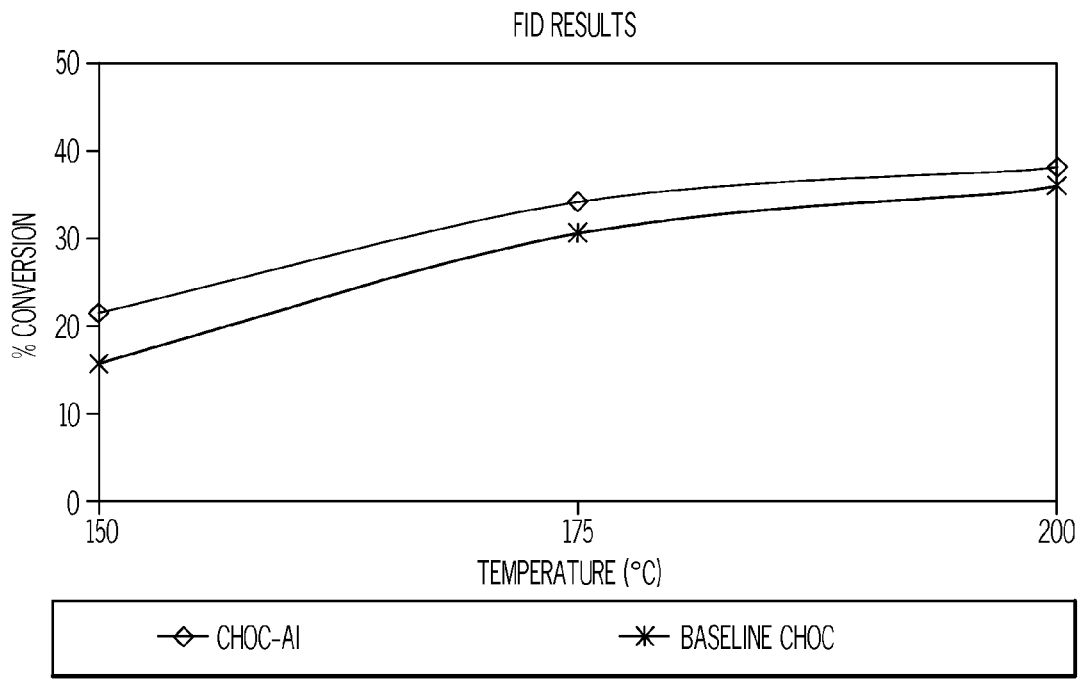
FIG. 7 is a plot of hydrocarbon reduction as a function of temperature according to an embodiment of the present invention.
Figure 8:
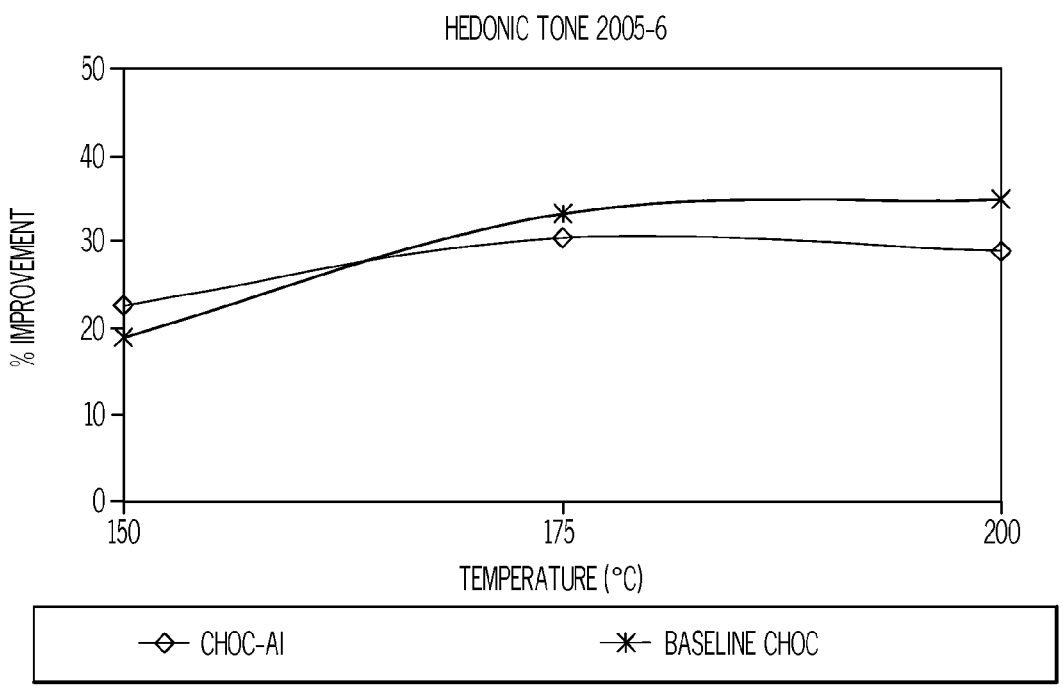
FIG. 8 is a plot of odor improvement as a function of temperature according to an embodiment of the present invention.
Figure 9:
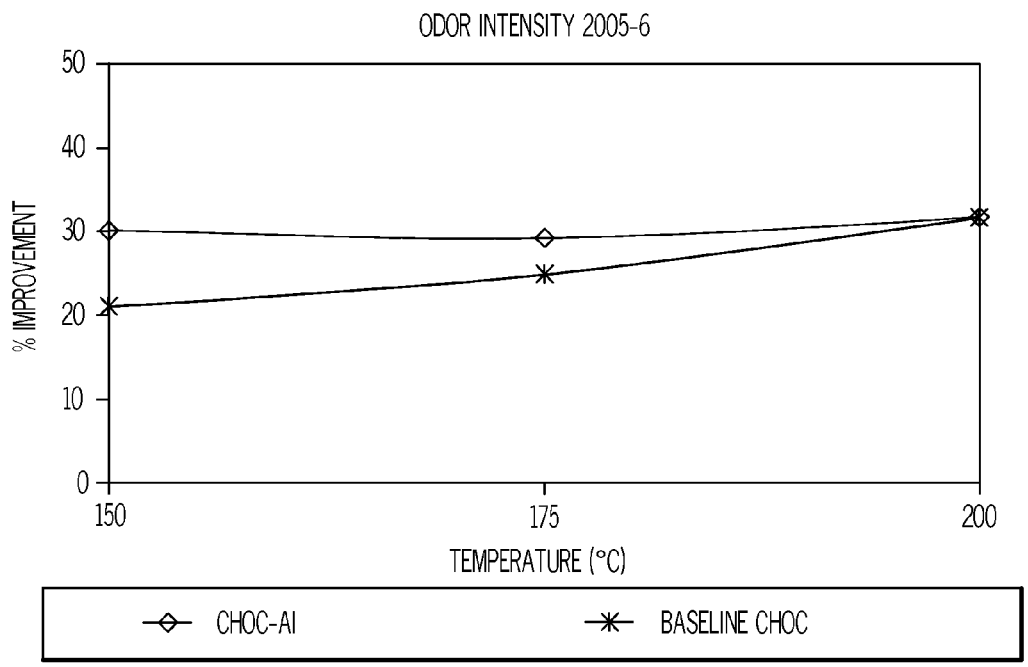
FIG. 9 is a plot of odor intensity as a function of temperature according to an embodiment of the present invention.
Figure 10:
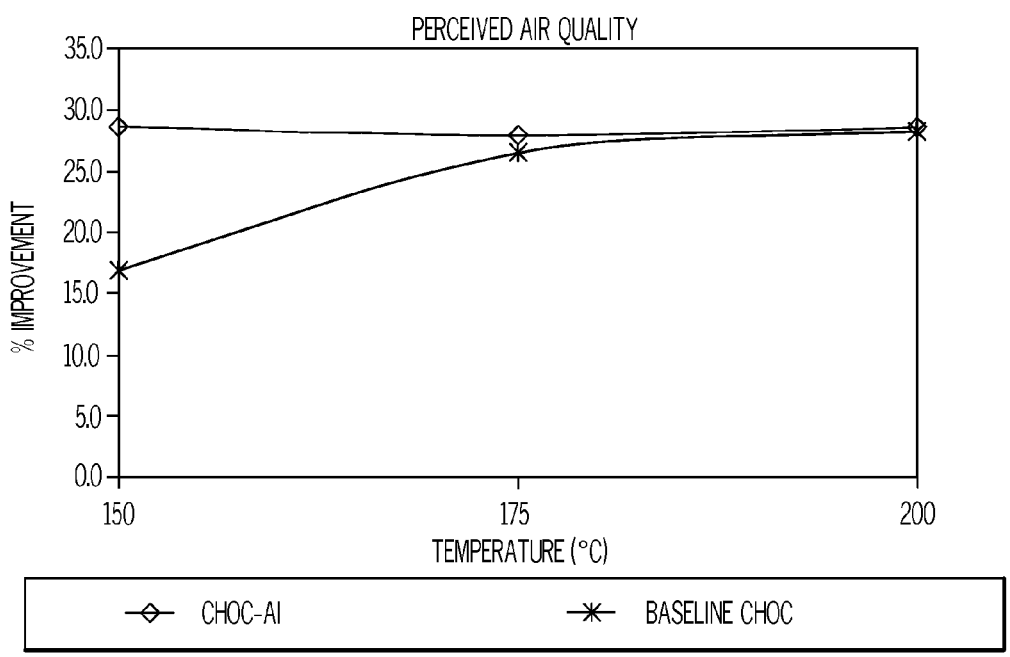
FIG. 10 is a plot of air quality improvement as a function of temperature according to an embodiment of the present invention.
Figure 11:
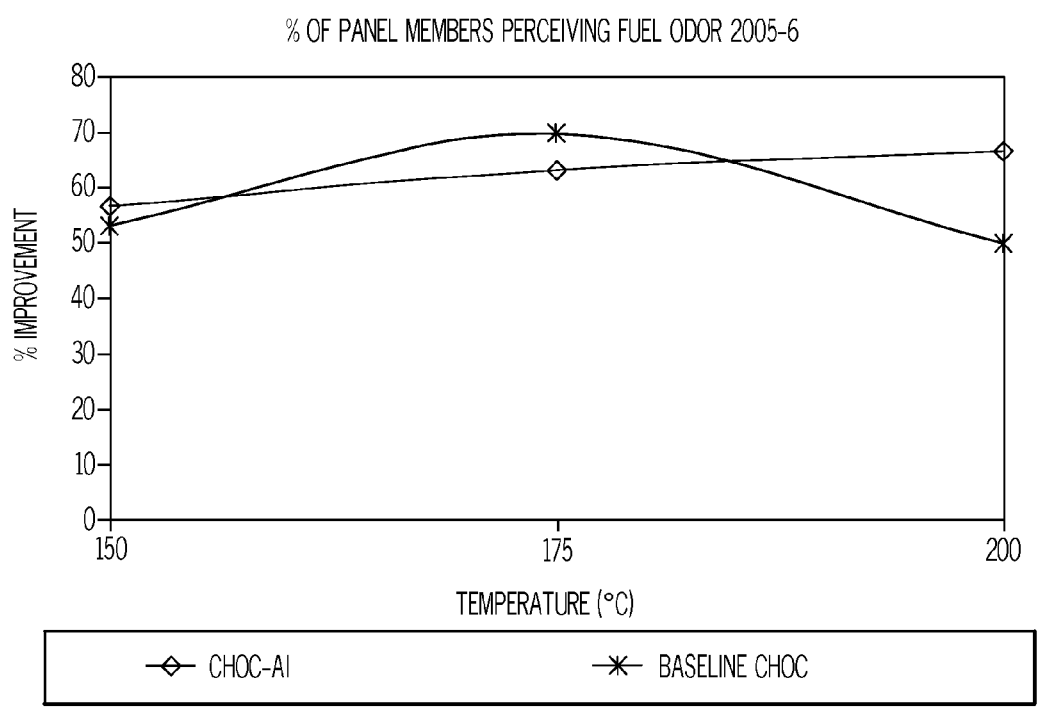
FIG. 11 is a plot of fuel odor perception as a function of temperature according to an embodiment of the present invention.

A baseline CHOC (containing no alumina in the washcoat) and a CHOC stabilized with alumina were compared. The design parameters for the baseline CHOC and the CHOC containing alumina (CHOC-Al) are shown in FIG. 5. As can be seen in FIG. 6, ozone conversion after contamination is improved for the CHOC-Al. For comparison, FIG. 6 also includes an ozone converter without platinum. As can be seen in the flame ionization results of FIG. 7, hydrocarbon conversion is improved for the CHOC-Al, even though the platinum loading is lower. The hedonic tone analysis (measurement of the pleasantness or unpleasantness of an odor) of FIG. 8 shows improvement at low temperature for the CHOC-Al. As can be seen in FIG. 9, odor intensity is improved for the CHOC-Al at intermediate and low temperatures. The perceived air quality (measure of the acceptability of the air) shown in FIG. 10 is significantly improved at low temperature and the fuel odor perception shown in FIG. 11 also indicates improvement at low and high temperatures for the CHOC-Al.

As can be appreciated by those skilled in the art, embodiments of the present invention can provide improved combined hydrocarbon and ozone converters. Embodiments of the present invention can provide improved catalytic converters that do not increase manufacturing costs. Embodiments of the present invention can increase hydrocarbon conversion without increasing the amount of hydrocarbon catalyst.

It should be understood, of course, that the foregoing relates to exemplary embodiments of the invention and that modifications may be made without departing from the spirit and scope of the invention as set forth in the following claims.

We claim:

1. An apparatus comprising:
   a substrate;
   a washcoat in contact with said substrate, said washcoat including an ozone reacting component and a non-catalytic component prepared by mixing and applying a slurry of a metal oxide precursor, a cobalt salt and a binder to the substrate; and
   a hydrocarbon converting catalyst impregnated into said washcoat wherein a weight ratio of said hydrocarbon converting catalyst to said ozone reacting component is between about 1:5 and about 1:100.

2. The apparatus of claim 1, wherein said ozone reacting component comprises cobalt oxide, and the cobalt salt comprises cobalt carbonate.

3. The apparatus of claim 1, wherein said washcoat further includes a silica binder and wherein said non-catalytic component comprises aluminum oxide.

4. The apparatus of claim 1, wherein said hydrocarbon converting catalyst comprises platinum.

5. The apparatus of claim 1, wherein said ozone reacting component comprises cobalt oxide, said non-catalytic component comprises aluminum oxide, and a weight ratio of said cobalt oxide to said aluminum oxide is between about 1:0.6 and about 1:2.

6. The apparatus of claim 1, wherein said substrate is selected from the group consisting of ceramic, aluminum, steel and nickel alloys.

7. The apparatus of claim 1, wherein said hydrocarbon converting catalyst comprises platinum, said ozone reacting component comprises cobalt oxide, and a weight ratio of said platinum to said cobalt oxide is between about 1:5 and about 1:11.

8. The apparatus of claim 1, wherein the weight of said ozone reacting component is about equal to the weight of said non-catalytic component.

9. The apparatus of claim 1, wherein said substrate comprises a component of an environmental control system.

10. The apparatus of claim 1, wherein said hydrocarbon converting catalyst comprises platinum and a weight ratio of said platinum to said ozone reacting component is between about 1:5 and about 1:11.

11. An apparatus comprising:
    a substrate;
    a washcoat deposited onto said substrate, said washcoat applied as a mixture of boehmite and cobalt carbonate and calcined to include cobalt oxide and aluminum oxide wherein a weight ratio of said cobalt oxide to said aluminum oxide is between about 1:0.6 and about 1:2; and
    a precious metal impregnated into said washcoat.

12. The apparatus of claim 11, wherein said precious metal comprises platinum.

13. The apparatus of claim 11, wherein a weight ratio of said precious metal to said cobalt oxide is between about 1:5 and about 1:100.

14. The apparatus of claim 11, wherein said precious metal comprises platinum and wherein a weight ratio of said platinum to said cobalt oxide is between about 1:5 and about 1:11.

15. The apparatus of claim 11, wherein said substrate comprises an auxiliary power unit bleed duct.

16. The apparatus of claim 11, wherein said substrate is designed to position said washcoat in fluid communication with a supply of bleed air.

17. A method of providing a conditioned air flow comprising the steps of:
    providing a supply of bleed air that includes a plurality of ozone molecules and a plurality of hydrocarbon molecules;
    passing said supply of bleed air in contact with a catalytic converter, said catalytic converter including cobalt oxide, aluminum oxide and platinum prepared by applying a mixture of boehmite and a cobalt salt to the converter and calcining the mixture;
    destroying at least one of said ozone molecules; and
    converting at least one of said hydrocarbon molecules to carbon dioxide and water.

18. The method of claim 17, wherein said step of passing the supply of bleed air in contact with a catalytic converter comprises passing the supply of bleed air through an environmental control system of an aircraft.

19. The method of claim 17, wherein said step of providing a supply of bleed air comprises providing a compressed air flow from a main engine of an aircraft.

20. The method of claim 17, wherein said step of passing the supply of bleed air in contact with a catalytic converter comprises passing the supply of bleed air through a precooler of an aircraft.

* * * * *